(12) United States Patent
Vipul et al.

(10) Patent No.: US 9,223,822 B1
(45) Date of Patent: Dec. 29, 2015

(54) TECHNIQUES FOR PERFORMING INDICATION MANAGEMENT

(75) Inventors: Utkarsh Vipul, Portsmouth, NH (US); Ken Kim, Worcester, MA (US); Lorenzo Bailey, Framingham, MA (US); Yong Wang, Westborough, MA (US); Muhamad Djunaedi, Northborough, MA (US); Xuan Tang, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 425 days.

(21) Appl. No.: 13/135,080

(22) Filed: Jun. 24, 2011

(51) Int. Cl.
*G06F 17/30* (2006.01)

(52) U.S. Cl.
CPC .............................. *G06F 17/30368* (2013.01)

(58) Field of Classification Search
None
See application file for complete search history.

(56) References Cited

U.S. PATENT DOCUMENTS

| | | | |
|---|---|---|---|
| 6,618,822 B1* | 9/2003 | Loaiza et al. | 714/20 |
| 7,707,219 B1* | 4/2010 | Bruso et al. | 707/758 |
| 2002/0133509 A1* | 9/2002 | Johnston et al. | 707/203 |
| 2005/0192989 A1* | 9/2005 | Adiba et al. | 707/101 |
| 2007/0174315 A1* | 7/2007 | Leff et al. | 707/101 |
| 2007/0219952 A1* | 9/2007 | Ahmed et al. | 707/2 |
| 2008/0140721 A1* | 6/2008 | Kalmick et al. | 707/104.1 |
| 2009/0070315 A1* | 3/2009 | Ahmed et al. | 707/5 |
| 2010/0088685 A1* | 4/2010 | Ahmed et al. | 717/140 |
| 2010/0138440 A1* | 6/2010 | Driesen | 707/765 |
| 2012/0089610 A1* | 4/2012 | Agrawal et al. | 707/741 |

OTHER PUBLICATIONS

U.S. Appl. No. 13/065,738, filed Mar. 29, 2011 for "Techniques for Performing View Indication Management".
U.S. Appl. No. 13/065,735, filed Mar. 29, 2011 for Techniques for Mapping Data Models Using an Intermediate Processing Layer.
U.S. Appl. No. 12/928,653, filed Dec. 15, 2010 for "Techniques for Performing Indication Management".

* cited by examiner

*Primary Examiner* — Charles Adams
(74) *Attorney, Agent, or Firm* — Muirhead and Saturnelli, LLC

(57) ABSTRACT

Described are techniques for performing indication management. Registration criteria is received that includes information identifying a first set data elements of a first data model about which a subscriber is registered to receive notifications. Operations are performed to a second set of data elements stored in a first table of a database in accordance with a second data model where the operations each modify an existing data element of the first table, add a row to said first table or delete a row from said first table. Information is recorded in a delta table regarding the operations. A query is executed that uses the delta table and the first table to generate a virtual table including information regarding the operations performed. First processing is performed using the virtual table to determine notifications for the subscriber regarding data elements of the first set in accordance with said registration criteria.

20 Claims, 11 Drawing Sheets

900

| LUN # | Name | Action type | LUN # | Name | |
|---|---|---|---|---|---|
| 5 | LUN 5 | Delete | NULL | NULL | |
| 4 | LUN 4 | Add/new | 4 | LUN 4 | 910 |
| 1 | LUN 1 | Change | 1 | NEW | |
| NULL | NULL | No change | 0 | LUN 0 | |
| NULL | NULL | No change | 2 | LUN 2 | 920 |
| NULL | NULL | No change | 3 | LUN 3 | |

```
602   Select * from Delta_TABLE  LEFT JOIN  AFTER_TABLE
604           on Delta_TABLE . KEY = AFTER_TABLE . KEY

606   UNION

608   Select * from After_table ACTION TYPE as "NO CHANGE"
610   Where NOT EXISTS
612           (Select * FROM Delta_table  INNER JOIN After_table
614            On Delta_table.KEY = After_table . KEY )
```

| LUN # | Name | Action type | LUN # | Name |
|---|---|---|---|---|
| 5 | LUN 5 | Delete | NULL | NULL |
| 4 | LUN 4 | Add/new | 4 | LUN 4 |
| 1 | LUN 1 | Change | 1 | NEW |
| NULL | NULL | No change | 0 | LUN 0 |
| NULL | NULL | No change | 2 | LUN 2 |
| NULL | NULL | No change | 3 | LUN 3 |

FIGURE 10

TECHNIQUES FOR PERFORMING INDICATION MANAGEMENT

BACKGROUND

1. Technical Field

This application relates to techniques used in connection with indication management in a system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, a subscriber may register to receive notifications regarding the occurrence of events in the system. Upon the occurrence of an event for which the subscriber is registered, a notification is sent to the subscriber.

SUMMARY OF THE INVENTION

In accordance with one aspect of the invention is a method for performing indication management comprising: receiving registration criteria including information identifying a first set of one or more data elements of a first data model about which a subscriber is registered to receive notifications; performing one or more operations to a second set of one or more data elements stored in a first table of a database in accordance with a second data model, each of said one or more operations being an operation to modify an existing data element of the first table, add a row to said first table or delete a row from said first table; recording in a delta table information regarding said one or more operations; executing a query that uses said delta table and said first table to generate a virtual table including information regarding said one or more operations performed to said first table; and performing first processing to determine notifications for the subscriber regarding data elements of the first set in accordance with said registration criteria, said first processing using information including said virtual table. The method may include selectively setting one or more database triggers on said first table based on said registration criteria. A database trigger may be fired in response to performing each of said one or more operations to said first table of the database. A registered callback may be invoked in response to said database trigger and said registered callback records information in the delta table for said each operation. The first processing may include determining dependencies of said first set of data elements upon said one or more data elements of said first table using said virtual table; and determining whether modifications made to said first table as indicated by said virtual table result in a change to a registered data element about which a client is registered to receive notification regarding one or more operations performed with respect to the registered data element. The dependencies may be determined using mapping information identifying which registered data elements of the first data model are dependent on data elements of the second data model. The virtual table may include a row describing each object in said first table and each object in said delta table, each row in said virtual table having a unique value of a primary key identifying a different object of the second data model, said primary key being a primary key of said first table and said delta table. The virtual table may include a row for each of said one or more operations, said row including information identifying a type of operation as any of said modify, said add, said delete, or no change. The first processing may include determining net changes to registered data elements of the first data model using rows of said virtual table including a type of operation of any of modify, add or delete, and omitting rows having an associated type of operation of no change. The delta table may indicate a type of operation for each entry of said delta table that is any of modify, delete or add. The one or more operations may be actions performed to the database based on differences determined between data obtained for two successive polling intervals. The first data model may be an object model including a plurality of objects and, for each of said plurality of objects, one or more attributes. The first set of one or more data elements may identify at least one of the plurality of objects or at least one attribute of one of said plurality of objects. The first set may identify a first object and said registration criteria may indicate to provide notification regarding a change to one or more attributes of the object. The registration criteria may include providing notification regarding any of deletion of an object, creation of an object, modification to an attribute of an object, and modification to any object of a class. A first data element in the first data model identified in the registration criteria may be determined to be dependent upon a plurality of data elements from the second data model. The first data element may be an object having a plurality of attributes, a first of the plurality of attributes being determined using one or more data elements from the second model. The query may include a plurality of select statements and a union operation of results of each of said select statements.

In accordance with another aspect of the invention is a computer readable medium comprising code stored thereon for performing indication management, the computer readable medium comprising code for: receiving registration criteria including information identifying a first set of one or more data elements of a first data model about which a subscriber is registered to receive notifications; performing one or more operations to a second set of one or more data elements stored in a first table of a database in accordance with a second data model, each of said one or more operations being an operation to modify an existing data element of the first table, add a row to said first table or delete a row from said first table; recording in a delta table information regarding said one or more operations; executing a query that uses said delta table and said first table to generate a virtual table including information regarding said one or more operations performed to said first table; and performing first processing to determine notifications for the subscriber regarding data elements of the first set in accordance with said registration criteria, said first processing using information including said virtual table. The computer readable medium may also include code for selectively setting one or more database triggers on said first table based on said registration criteria. A database trigger may be fired in response to performing each of said one or more operations to said first table of the database and a registered callback may be invoked in response to said database trigger and said registered callback records information in the delta table for said each operation.

BRIEF DESCRIPTION OF THE DRAWINGS

Features and advantages of the present invention will become more apparent from the following detailed description of exemplary embodiments thereof taken in conjunction with the accompanying drawings in which:

FIG. 7 is an example representing a data query that may be used to generate a snapshot view or virtual table in connection with an embodiment in accordance with techniques herein;

FIGS. 8-10 illustrate results of execution various portions of the query of FIG. 7.

DETAILED DESCRIPTION OF EMBODIMENT(S)

Figure 1:
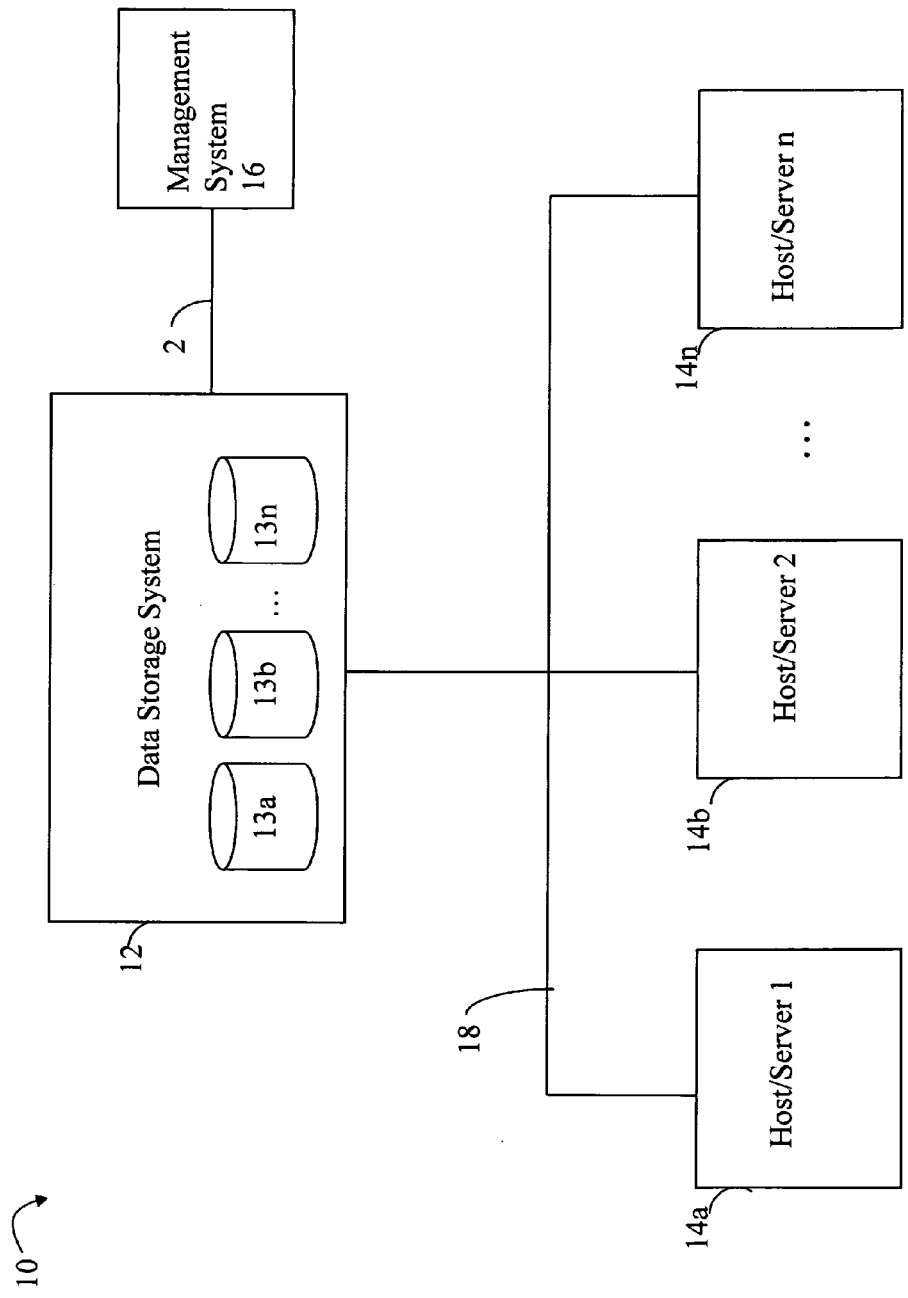
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
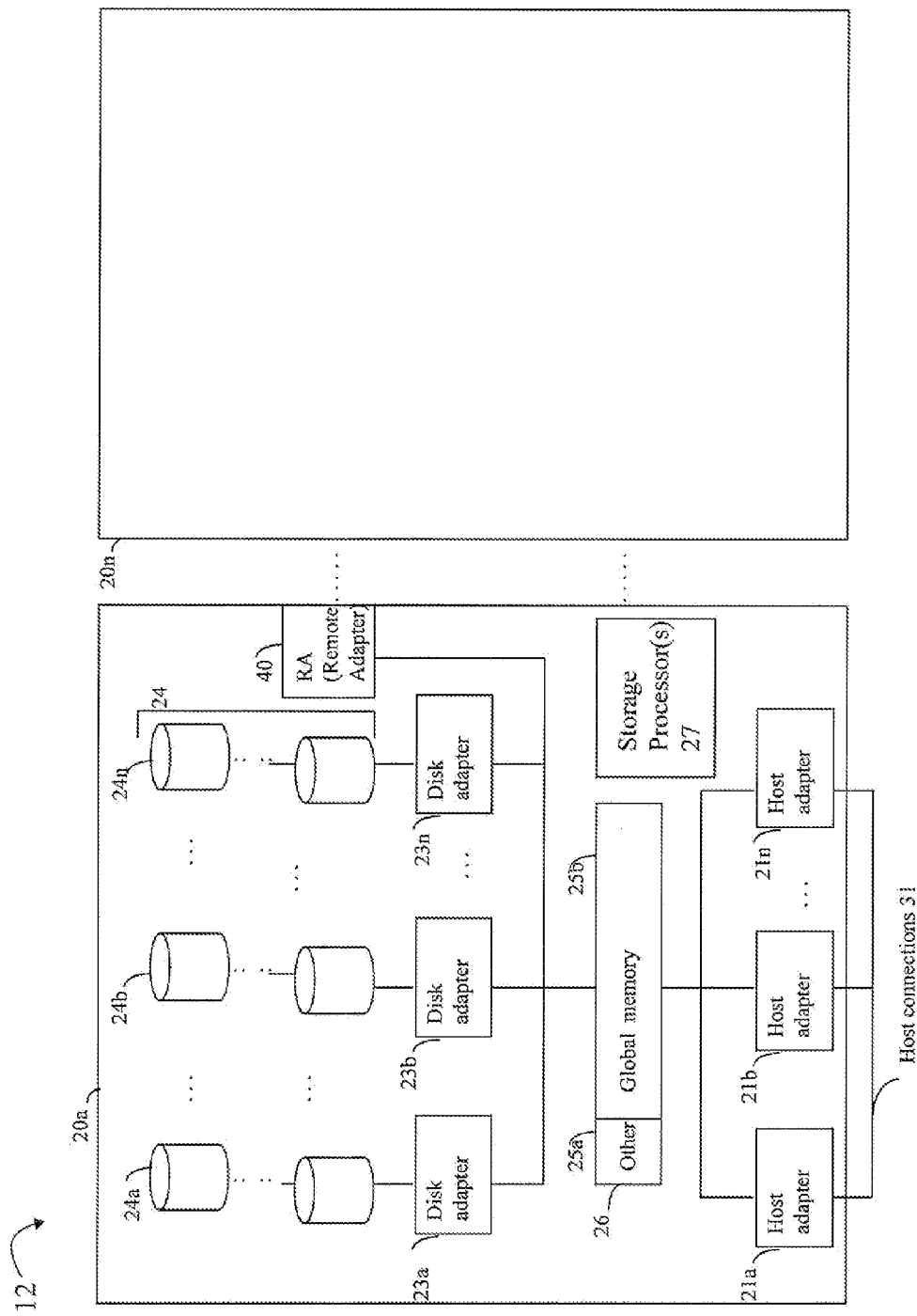
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

In connection with techniques herein, the management system 16 may issue a request to the data storage system such as illustrated in FIG. 1. The request may be to provide a logical system configuration view regarding components of the data storage system, the state of such components, and the like. In response to receiving the client request, the data storage system may provide the requested information to the client. As described in more detail below, at various points in time, the data storage system may continually collect the configuration information regarding its current configuration. The data storage system may store the configuration information in database tables. In response to the client request, the data provided to the client may be based on a database view or virtual table generated from the database tables at the time the client request is received and processed. For example, the data provided to the client may be generated by executing one or more commands performing a database query of the database tables. The result of the query may be the view or virtual table provided to the client. During the time the client session is active, the data storage system may receive one or more updates to its configuration information stored in the database tables. In response to updates to the database tables, it may be desirable to appropriately provide any updates to the virtual entity, the view, as used by the client since changes made to the database tables may also affect data of the view.

Described in following paragraphs are techniques that may be used in connection with providing indications or notifications to the client regarding any data changes affecting the view as used by the client. More generally, the techniques herein may be used in connection with providing such indications or notification to a client which uses objects of a client object model where such objects may be used in connection with a client view or virtual table, a database table, and the like. For example, the objects as used by the client may also be included in a client database or other data store in accordance with the client object model. As described below in more detail, such techniques used in connection with client indications provide for recording or tracking modifications to one or more database tables using a second data model different from the client object model where such modifications reflect applying the set of operations to the one or more database tables of the second data model. Such modifications, which may include, for example, operations to add, delete and/or change an existing data element, are tracked in another table, referred to as the delta table herein, in response to the firing of database triggers indicating that the operations have been applied to the database tables of the second data model. The entire set of operations to the database tables of the second data model may be processed as a group, or in "bulk", to determine one or more snapshot views or virtual tables describing the resulting impact to the database tables of the second model in connection with applying the set of operations. Mappings may be used to determine dependencies between the database tables of the second data model and the affected client tables as used by the client (e.g., client database tables or client virtual tables described in more detail below). The mappings may be used in combination with the snapshot views by an indication framework to calculate the changes to the client tables based on changes to the underlying other database tables of the second data model. Indications may then be generated for the client tables (virtual or otherwise) based on the foregoing calculations. In connection with the foregoing, a subscription request may be generated for the client using a client table (virtual table, database table, or otherwise) to register to receive notifications regarding data changes of the database tables of the second database model affecting the client-based objects or structures as used by the client. An embodiment may only track changes for those data elements included in registered client subscription requests to thereby further increase the efficiency of indication processing in accordance with techniques herein. It should be noted that although the techniques herein may be illustrated in the context, for example, of providing data storage configuration information, the techniques herein may be used more generally in providing notifications or indications to the client in connection with any type of data structure or entity used by the client including, for example, client objects included in a client database, client objects included in a view or virtual table as may be generated using database queries applied to one or more database tables of a database, and the like.

As noted above, the techniques herein may be used with an object-based model. The database tables of the second data model upon which the client objects depend may be referred to herein as being based on a database model. Both the client model and the database model may be object-based models although both may use a different object model thereby requiring mapping between dependencies of the object model used by the client and the database object model. The object model used or consumable by the client (whether used by the client in connection with a virtual table or view, client database table, or other structure) may be referred to as the client data model. Thus, the client's virtual table or client database tables used by the client may be characterized as being in accordance with the client data model generated using database tables in accordance with the database model. In the embodiment described herein, both the client data model and the database model may be different object-based models. The client may use any of a virtual table, client database table, and the like, generated from database tables of the database model. In such an embodiment using object-based models, a row in a database table or virtual table (used by the client object model and database object model) may correspond to an object instance and each column in the table may correspond to an attribute or property of the object. The object may correspond to, and represent the state of, a physical or logical entity in the data storage system. For example, depending on the model, an object may represent a physical component such as a fan, power supply, port, logical storage device, or physical storage device. The physical and/or logical component may be characterized by state information represented as properties or attributes of an object. For example, an object corresponding to a physical storage device may have attributes representing the total available storage capacity, an amount of unused or free storage capacity, physical device characteristics, and the like. An object may also represent a logical entity such as a RAID group, LUN or LV, storage group of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

Additional details regarding the client's use of a virtual table or view, such as may be used in some embodiments in accordance with techniques herein, is described, for example, in U.S. patent application Ser. No. 13/065,738 (the '738 application), filed Mar. 29, 2011, TECHNIQUES FOR PERFORMING VIEW INDICATION MANAGEMENT, which is incorporated by reference herein.

As mentioned above, the client may use data of a view. Furthermore, as described below in more detail, the techniques herein for indication management may use snapshot views or virtual tables. In connection with databases, a view may be generated based on a stored database query. The view may be accessible as a virtual table including the result set of the query. In contrast to ordinary database tables, a view may be characterized as a dynamic virtual table computed or collated from database tables. Therefore, changing first data of a database table upon which second data of a view is dependent thereby may also cause changes to the view or virtual table. Views may represent, for example, a subset of data included in one or more database tables. Views may also join and simplify multiple database tables into a single virtual table, aggregate data from one or more database tables, and the like. For example, a view may include a property of an object which is based on a calculation performed using multiple values from one or more objects of one or more database tables (e.g., sum, average). As another example, a view or virtual table may include an object which is the result of combining rows of multiple database tables. In one aspect, a view is a logical entity generated as a result of executing a query. The resulting logical entity of the query execution may include pointers or identifiers of corresponding data elements of database tables as included in the virtual table or view. Thus, the view is not a copy of the data as in database tables. Rather, the view may include references or pointer to the data as included in other database tables.

In an embodiment in accordance with techniques herein providing indications or notifications to the client in response to data changes affecting tables, objects, and the like, used by the client in accordance with the client object model, the client may register or subscribe to receive notifications for changes affecting such structures (e.g. indicating that the client's table needs to be modified such as by adding a new row of information to the table, deleting an existing row from the table, or updating one or more data elements of an existing row of the table) used by the client (e.g., such as of a client virtual table or client database table). Described in following paragraphs are techniques that may be used in an embodiment in connection with indication management. The techniques herein provide for selective data processing and tracking of indications for those client data elements for which a client is registered. An embodiment described in following paragraphs may use an object-based model although other embodiments in accordance with techniques herein may use different types of data model(s). In such an embodiment using an object-based model, registration and notification to the client may be performed with respect to objects, an attribute or property of an object, and/or a class of objects as in the client data model for one or more data structures currently used by the client such as in connection with a client view or virtual table or client database tables Clients may register to receive indication notifications regarding any one or more type of events regarding client-based objects. A client may register to receive notification regarding different levels and/or categories of changes as related to virtual tables and/or database tables used by the client. For example, with respect to a client database table, the client may register to receive notifications regarding changes to any object, changes to one or more specified objects (e.g., changes to any attribute of the specified objects), changes to one or more specified attributes of an object, when any new object is created, when any object is deleted, and the like, such as with respect to that particular client table. A client may also register to receive class-level indications such as with respect to a class of objects in the client data model as used by the client. For example, a client may register to receive notification when a new object in a specified class is created, when an object in a specified class is deleted, when there is any change to an attribute of an object of a specified class, and the like. The foregoing, as well as other criteria, may be used in connection with client subscriptions specified during a registration process for the client where such registration may be made with respect to one or more client objects as may be included in a client's database table, client's virtual table, and the like.

In one embodiment in accordance with techniques herein, the registration criteria and clients may use the client object model as described above. As will be described in more detail in following paragraphs, information regarding the state of entities in the data storage system may be collected and stored in accordance with a different model of the database (referred to as the database model as noted above). Using techniques herein, processing may be performed to map data elements of client object model to corresponding ones of the database object model and vice versa in connection with providing indications.

Figure 3:
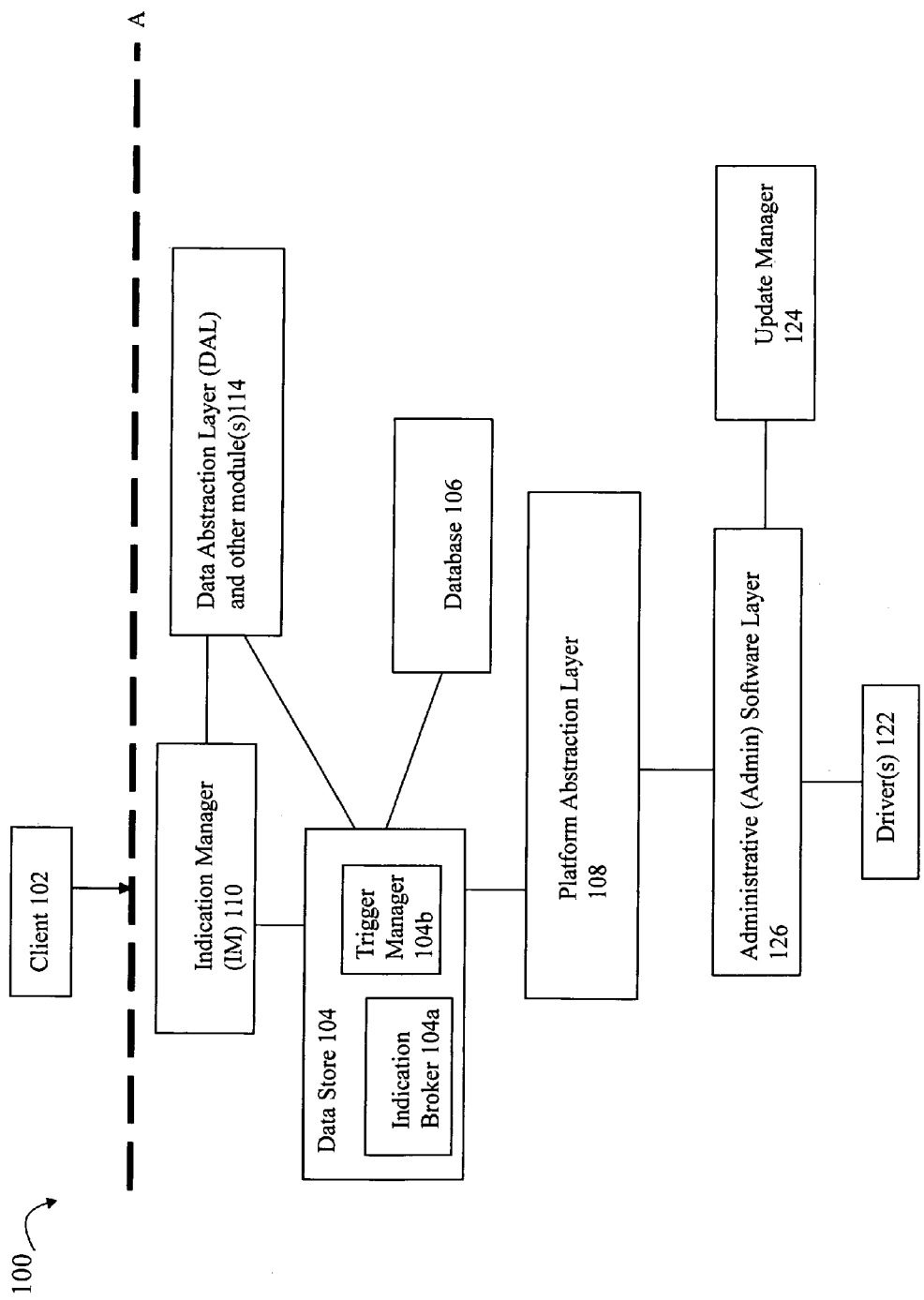
FIG. 3 is an example illustrating data flow and communications between components in an embodiment in accordance with techniques herein when performing indication registration processing.

Referring to FIG. 3, shown is an example of a components that may be included in an embodiment in accordance with techniques herein. The example 100 includes components of the data storage system and an external client 102 used to illustrate software components or modules that may be used in connection with indication management in accordance with techniques herein. The dashed line denoted as A may represent a partitioning of components included in the data storage system (e.g., those below the dashed line A) and those which are external to the data storage system (e.g., those above the dashed line A). The example 100 includes a remote or external client 102, indication manager (IM) 110, data store 104, database 106, platform abstraction layer (PAL) 108, data abstraction layer (DAL) and other modules 114, admin (administrative) software layer 126, update manager 124, and driver(s) 122. The data store 104 may include an indication broker 104a and a trigger manager 104b. It should be noted that the foregoing is merely one representation of how functionality performed in connection with techniques herein may be partitioned among various software modules and, more generally, an embodiment in accordance with techniques herein may use any suitable partitioning of processing amongst various modules.

A client, such as external or remote client 102, may register with the IM 110 to receive notifications with respect to data changes affecting structures, such as tables, objects, properties or object attributes, and the like used by the client. In connection with client registration, registration criteria may be specified, such as described elsewhere herein in more detail, in terms of the client data model identifying the objects, attributes, and/or classes and types of operations on objects and/or classes (e.g., creation, deletion, changes or modifications) about which the client is to be notified regarding data changes affecting the client structures as used by the client. As part of client registration, such registration criteria may be transmitted from the external client 102 to the IM 110. Client 102 may be characterized as a registered subscriber of IM 110 for view notifications.

The IM 110 may maintain a list of registration criteria for use with techniques herein where the list includes information representing what content, such as data elements, in the registered client structure(s) is monitored in connection with determining whether to send notifications to registered subscriber(s). The list of registration criteria may identify the objects and/or attributes such as with respect to a client table that are registered. The IM 110 may be notified as described in more detail below when there is a data change affecting one or more registered client data elements. Accordingly, the IM 110 may then notify the appropriate client using the affected client data elements.

Data describing a state of components of the data storage system may be stored in the database 106. Element 106 may represent a database or other data container in which data is stored. The client structure, such as a client table, for which indication management is performed and for which registration is performed for client 102 may depend on one or more values of one or more database tables included in the database 106. The client table or other structure used by client 102 may be in accordance with a client object data model as described above and elsewhere herein. The database 106 may include database tables used to generate the client structures. The database tables of the database 106 may be in accordance with the database object model as described above and elsewhere herein.

The drivers 122 collect information which is reported through a call stack of software layers including the admin software layer 126, PAL 108, and data store 104, where such information may then be stored in the database 106 by the data store 104.

The update manager 124 may generate a request to poll the drivers 130 for state information. The update manager 124 may generate a polling request in response to an occurrence of a defined polling interval, as well as an occurrence of one or more other defined events. The update manager 124 may issue the request to the admin modules of layer 126 which then obtain the state information from the drivers 130. The admin modules of layer 126 then communicate the state information to the PAL 108 and then data store 104. The data store 104 may process the received state information and populate the database 106 by performing database operations such as by issuing appropriate database commands including update, insert (e.g., add) and/or delete database commands to update database table(s). The layer 126 may receive data in the form of objects in accordance with an administrative data model which may then be further mapped into the database model as stored in the database 106. The database model of the database 106 may include data stored in one or more database tables where such tables include one or more rows of data elements as described elsewhere herein.

The data store 104 may perform database operations which update the appropriate database tables, and portions thereof, in accordance with the received state information from the drivers 130. The data store 104 includes a trigger manager 104b which sets appropriate database triggers (as explained in more detail below) so that upon the occurrence of a database operation which fires a trigger, the trigger manager 104b is notified by the database 106. Such trigger indications may identify, for example, which row of a database table has been modified as a result of performing a database operation to store the received state information. In one embodiment, database 106 may track the database table row-level changes and notify the trigger manager 104b regarding such changes in accordance with previously set database triggers. The database 106 may provide the trigger manager 104b with a database (DB) key or row identifier (ID) used to identify each row of a database table that has been modified as a result of performing the database operations causing a trigger to fire.

In connection with performing the database operations such as update, insert and/or delete with respect to a row of a database table, it should be noted that the net or end result of performing a database operation on the database 106 may not cause a change to one or more data values stored in the database tables of the database 106 and/or a table or other structure as used by the client 102. For example, an update command may rewrite a same data value to a row of a database table. As another example, if a client table is dependent on a row of data of a first database table, an update to the row of the database table may not result in a change to the data included in the client table. To further illustrate, the row of the database table may include 5 values and the client table may include a data element which is the sum of the 5 values in the database table row. The database table row may be updated to modify and change one or more of the values. However, the resulting sum as included in the client table may be the same before and after such modification. As such, there is no change to the client table's data and no notification to the client using the client table is needed. Based on this, a determination as to whether a data value currently stored in the database 106 and/or a data value of the client table has been updated to a different value may not be detectable solely based on tracking which database table rows have been updated, deleted and/or inserted. As described in more details below, the delta table and snapshot view may be used in connection with techniques herein with indication notification processing so that the client is notified only when there has been a change to a data value included in the client structure requiring that the client structure be updated. Even though the database operation may update a database table such as by adding a new row, deleting a row, or modifying one or more values of an existing row, such operation may be characterized as potentially resulting in a change or new data value to a registered structure used by the client. Processing may be performed in connection with techniques herein to determine if the foregoing change to a database tables of the database model used by the database 106 actually results in a change or new data value for a registered client data element, structure, and the like. If the net result of performing the database operation does not cause, for example, a current data value of the client structure to be replaced with a new data value different from the current data value, the techniques herein perform processing to detect the foregoing so that no indication is sent to the client. Furthermore, an embodiment in accordance with techniques herein may provide for selective processing to selectively track and perform indication management with respect to only those registered client data elements, such as objects, and the like, as used by the client. In general, an embodiment in accordance with techniques herein may selectively set database triggers for database model data elements based on registered data elements of the client object model which are dependent upon those database model data elements. If there is no registered client data element dependent upon a particular database model data element, then no database trigger is fired even if there is an operation that modifies the database model data element.

The DAL and other software module(s) 114 may generally represent functionality performed by DAL and one or more other modules as may be included in an embodiment in accordance with techniques herein. Modules of 114 may be used in connection with performing processing such as mapping data elements from the client object model to the database model, and vice-versa. Modules 114 may use mapping information to determine one or more data elements of the database 106 in accordance with the database model which correspond to other data elements of the client data model.

The database 106 may provide for database change tracking and notification whereby a software module, such as the trigger manager 104b, may register to receive notification for one or more changes to the database. For example, the trigger manager 104b or another code module may register to receive notification by the database 106 when there is an operation performed which modifies one or more database tables upon which a registered client table, client object, and the like, is dependent. The conditions or database events about which the module 104b is notified in accordance with techniques herein may be specified using database triggers described in more detail below. To this end, the module 104b may request to receive notification upon the occurrence of selected database operations to selected database tables, where the selected database operations and database tables may be identified via defined database triggers. The database trigger may be customized for the particular database tables upon which the registered client data elements or structures are dependent. The database operations that may be specified in a database trigger may include, for example with reference to a single database table of database 106, database commands to delete a row of a table, update an existing row of a table, or add a new row to a database table. In an embodiment utilizing an object-based model, a row of a table may correspond to an object instance and values in each column may correspond to an attribute or property of an object. In one embodiment, database trigger notification may provide for notification regarding the database table row-level changes. The notification message may vary with embodiment and may, for example, identify the table, the type of operation performed (e.g., table row delete, table row add, table row update), the modified or changed data related to the operation (e.g., what new data was added, deleted, if there was an update, both the old and new data), and the like. An embodiment may alternatively just provide a notification message about the operation performed and the database (DB) key or row identifier (ID) used to identify each row of a database table that has been modified as a result of performing the database operations. The module receiving the notification may then query the database for additional information to obtain the data related to the modification rather than have this transmitted as part of the database change tracking notification. An embodiment may also utilize a database implementing variations of the foregoing in connection with database change tracking and notification. For example, the database may optionally provide for different levels or granularity of change tracking and notification besides on a single database table row. For example, an embodiment may utilize a database providing change tracking at the database column level in addition to providing tracking and notification per database table row. All such embodiments and variations may utilize the techniques herein to provide for database change notification tracking.

Figure 4:
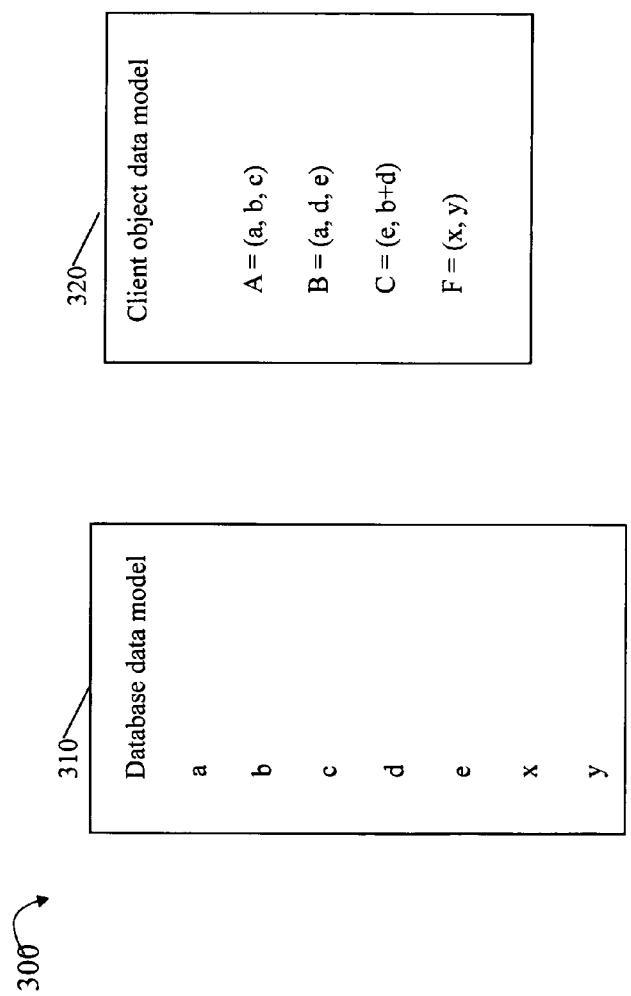
FIG. 4 is an example illustrating data dependencies between data elements of the client data model and database data model.

Referring to FIG. 4, shown is an example representation of data models and mapping information that may be used in connection with techniques herein. The example 300 includes a database data model representation 310 and a client object model representation 320. Element 310 identifies data elements included in the database data model. Element 320 identifies data elements of the client object data model. In the example 300 and in connection with other figures and paragraphs herein, lower case alphabetic characters represent data elements of the database data model (e.g., denoted "a", "b", "c", and the like, and upper case alphabetic characters represent data elements of the client object data model (e.g., denoted "A", "B", "C", and the like). Each data element of the client object data model 320 may be dependent upon one or more data elements of the database data model 310. For example, object A of 320 may represent an object including 3 attributes having values determined from (or dependent upon), respectively, database model data elements a, b, and c. As another example, object C of 320 may represent an object including 2 attributes having a first attribute value determined from database model data element e and a second attribute value determined from, or dependent on, database model data elements b and d (e.g. denoted b+d). As such, an embodiment may use mapping information such as generally represented in the example 300 to determine dependencies between client object data model elements and database data model elements. Such dependencies may be used in connection with selectively setting database triggers so that database triggers are only fired in response to a selected set of operations which impact or affect registered client data elements as identified in connection with a client subscription request. Additionally, the foregoing dependencies may be used in calculating affected changes to client data elements in response to fired database triggers. The foregoing is described in more detail in following paragraphs.

With reference back to FIG. 3, what will now be described is a general data flow in connection with processing a subscription request from the client 102. The client 102 may issue a subscription request to the IM 110 which then communicates with the indication broker 104a to process the received client indication request. Processing may be performed to determine the affected data of the database 106 (e.g., the database tables, data elements, rows of the database tables, and the like) upon which the client data objects identified in the subscription request depend. Subsequently, database triggers may be appropriately set. It should be noted that the particular database triggers set depend on the complexity of dependencies between registered client data elements and database data model data elements. For example, with reference to FIG. 4, A of the client object model depends on elements a, b, and c of the database data model. Assume A is a client object and a, b, and c are each properties of a single database object in a database table of 106. If the client registers to receive change or update notifications regarding A, database triggers may be set to fire if there are any of an update or deletion with respect to the single database object upon which client object A is dependent. Additional examples of dependencies between registered client data elements as may be included in client subscription requests and elements of the database object model are described, for example, in the '738 application and in connection with different data models as described, for example, in U.S. patent application Ser. No. 13/065,735, filed: Mar. 29, 2011, TECHNIQUES FOR MAPPING DATA MODELS USING AN INTERMEDIATE PROCESSING LAYER, which is incorporated by reference herein.

Figure 5:
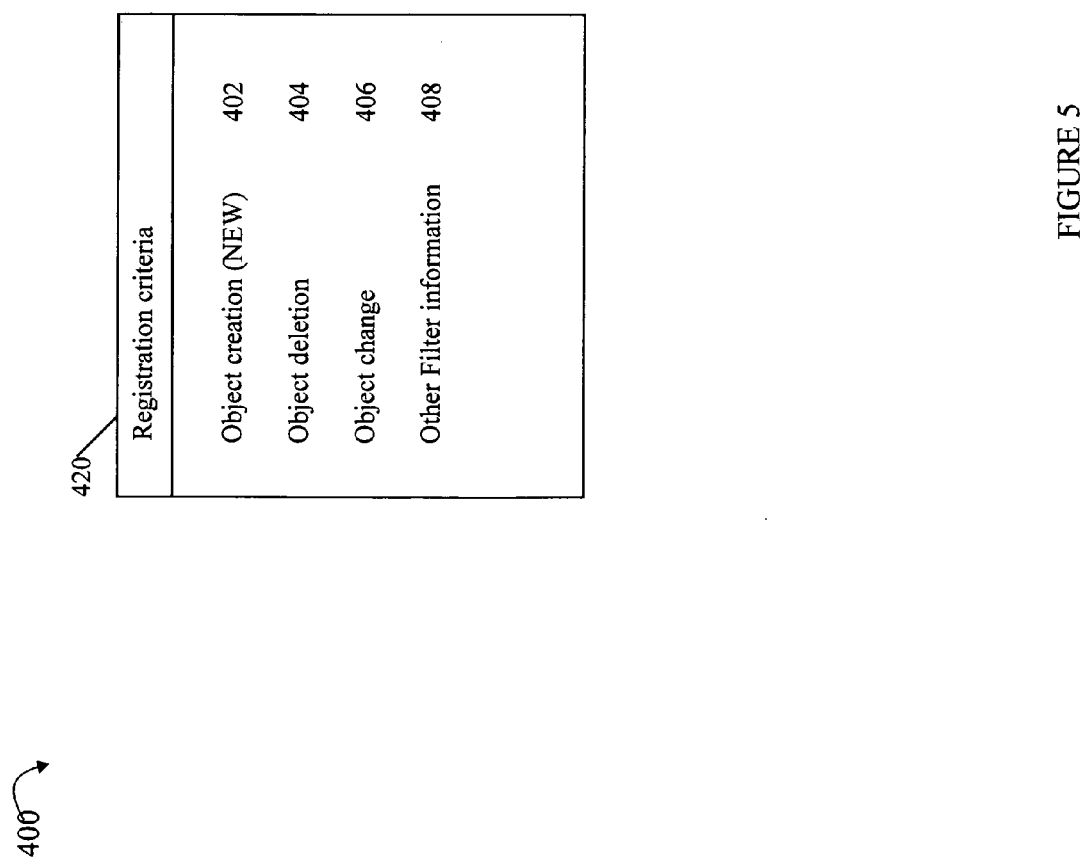
FIG. 5 is an example representation of registration criteria as may be used in an embodiment in accordance with techniques herein.

Referring to FIG. 5, shown is an example representation of information that may be stored in connection with registration criteria in an embodiment in accordance with techniques herein. The example 400 includes a table of information 420 that may collectively represent all registered data elements and other registration criteria such as may be used by the IM 110 or other component performing indication notification processing. In one embodiment, the criteria 420 may identify registered data elements of the client object data model in connection with other information used in determining whether to generate an indication notification for the registered data elements. For example, the criteria 420 may identify an object, attribute, and/or class and particular operations with respect to the foregoing. The criteria may identify, for example, whether notifications are generated when an object is created 402 (e.g., criteria may also specify to generate an indication notification when any object is created, or when an object of a specified class is created), when an object is deleted 404 (e.g., criteria may also specify to generate an indication notification when any object is deleted, when a named object is deleted, or when an object of a specified class is deleted), when an object is changed 406 (e.g., criteria may also specify to generate an indication notification when any attribute of any object has a changed data value, when any attribute of a named object has a changed data value, when one or more specified attributes of a named object are changed, or when any object of a specified class has an attribute value changed), and possibly other filter information 410. The other filter information 410 may generally represent, for example, the threshold (e.g. as a constant or a more general expression with possible mathematical and/or logical operations) and condition (e.g., greater than, less than, equal to, and the other comparatives) as described above in connection with filtering criteria. In an embodiment, the registered data elements of the client object model included in the criteria 420 may take any one or more suitable forms such as, for example, a list or other data structure of objects, attributes and/or classes.

What will now be described are techniques that may be used in connection with processing a set of changes to the database tables of the database 106 and generating any client indications based on the set. The foregoing may be characterized as processing client indications in "bulk" or as a group. As described above, for a polling period, appropriate database commands may be issued to update the tables of the database 106 based on differences between a new set of polling data received for the current polling period and an existing set of data from a previous polling period. The differences between the foregoing two sets of data may result in many updates to the database 106 thereby causing multiple database triggers to fire. In connection with techniques herein, an embodiment may perform processing to record or track all such changes to one or more database tables of the database 106 which occur as a result of updating the database 106 with a new set of polling data (e.g., for a single polling cycle and single set of polling data received therein). Rather than sequentially performing the following—receiving a single new database trigger firing, determining registered client object dependencies, firing client indications for the single new database trigger—as each database trigger occurs, an embodiment may, as a first step, record information in a delta database table for the set of database trigger firings or notifications received during a single polling interval for a single set of polling data; as a second step, determine for the entire delta database table, a snapshot view or virtual table encapsulating modifications to the database table; and as a third step, use the delta database table and the snapshot view to fire one or more client indications, if any. The techniques herein provide for efficiencies and flexibilities in connection with client indication management, processing and firings as will be realized more fully by those of ordinary skill in the art in light of description as set forth herein in more detail in following paragraphs.

As described above one or more database triggers may be set as appropriate based on the client indication subscriptions or registrations. Upon the occurrence of a polling interval, a new set of polling data may be received. Based on a number of differences between the new set of polling data and a current set already stored in the database 106 in accordance with the database model, many operations to the database 106 may be performed (e.g., multiple ones of update/change operations, add/new operations and/or delete operations) causing firing of multiple database triggers. Responsive to the firing of a database trigger as also described above, the callback routine or other registered body of code which is invoked may record information in a delta table as will now be illustrated. It should be noted that the illustrative examples set forth are made with respect to a single database table of the database 106. However, similar processing may be performed with respect to each such table of database 106.

Figure 6:
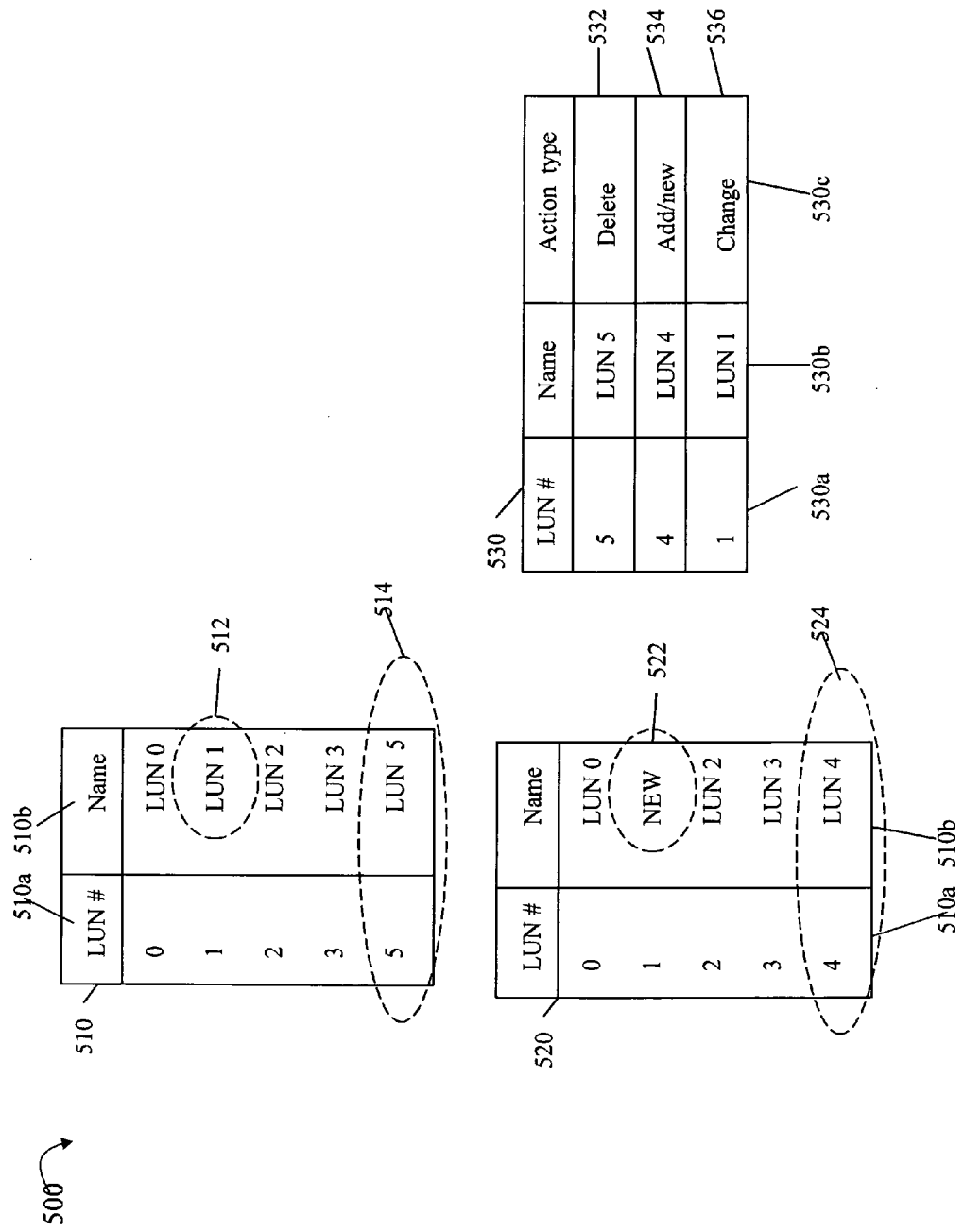
FIG. 6 is an example representation of tables that may be used in an embodiment in accordance with techniques herein.

Referring to FIG. 6, shown is an example 500 of tables that may be used in connection with processing in an embodiment in accordance with techniques herein. The example 500 includes a database table 510 of the database 106 at a first point in time prior to receiving a next set of polling data. The table 510 may be characterized as a LUN table including a first column 510a identifying a LUN # and a corresponding name 510b. The example 500 also includes tables 520 and 530. Table 520 is an updated version of table 520 at a second point in time after performing multiple database operations to modify the table 510 for a set of polling data received. The table 520 includes the same structure as table 510 as illustrated by the columns 510a, 510b. The delta table 530 may be another database table stored in the database 106. The delta table 530 may include a row or entry for each database operation performed to the table 510 causing a previously set database trigger to fire. Thus, table 530 serves a log or recording tracking the database operations applied for a received set of polling data where the recorded database operations modify the database table 510. Table 530 may include particular columns 530a and 530b corresponding, respectively, to columns 510a, 510b of tables 510, 520. In other words, 530 is the delta table recording information for a particular database table and may include information in accordance with the particular structure of the database table. Additionally, the delta table 530 includes an additional column 530c, action or operation type, identifying a type of the recorded database operation reflected by an entry. In one embodiment the value of 530c for each entry may be one of a predefined set of action types including delete/add or new, and change. An action type of delete means the corresponding row of the delta table 530 corresponds to a database operation which deleted a row of the database table 510. An action type of add or new means the corresponding row of the delta table 530 corresponds to a database operation which added a new row of the database table 510. An action type of change means the corresponding row of the delta table 530 corresponds to a database operation which changed or modified an existing row of the database table 510. The database may fire triggers with respect to a particular database table responsive to additions, deletions and/or newly added rows of the table (e.g., at the database table row level of granularity). With respect to tables 510 and 520, column 510a may be the primary key (PK) of the tables used to uniquely identify and index each row of the tables. Column 510b may represent a property or attribute of each object described by a row of the tables 510, 520.

At a second point in time, the next set of polling data may be received and multiple database operations may be performed to database table 510 resulting in updated database table 520. Furthermore, the multiple database operations cause multiple database triggers to fire as described above and the callback routine(s) or body(ies) of code invoked in response to the triggers firing may record information in delta table 530. A first database operation may be applied to table 510 to delete the last row as denoted by 514. The callback routine invoked (as a result of the corresponding database trigger firing responsive to performing the first database operation) may record entry 532 in the delta table 530. For a delete operation, the value recorded in the entry identifies the data of the delete rows of the table. A second database operation may be applied to table 510 to add a new row as denoted by 524. The callback routine invoked (as a result of the corresponding database trigger firing responsive to performing the second database operation) may record entry 534 in the delta table 530. For an add or new action type indicating that a new row was added to the table, the information recorded in 534 may be that of the newly added entry. A third database operation may be applied to table 510 to modify an object attribute as denoted by 512 and 522 wherein 512 indicates the value prior to performing the third database operation and element 522 indicates the value after performing the third database operation. The callback routine invoked (as a result of the corresponding database trigger firing responsive to performing the third database operation) may record entry 536 in the delta table 530. For an action type of change, the entry 536 may indicate the old or previous contents of the database table row prior to applying the change operation. The information in 530 may represent all database operations performed to database table 510 with respect to a single new set of polling data received. Each delta table 530 may be associated with a polling identifier or version identifier for a particular received polling period's data set. In one embodiment, the polling identifier may a timestamp associated with the received polling data set causing updates to the database as reflected in the delta table 530. The polling identifier may be used to associate the delta table 530 with its corresponding polling data set and may also be used to uniquely distinguish between different instances of delta table 530 obtained for different polling periods.

Thus, after processing the complete set of polling data and performing resulting database operations to update the database 106, the contents of table 510 has been updated to that as represented in table 520. For purposes of reference in discussion, the database table 510 at a first point in time (e.g., prior to applying database operations modifying the table 510 and as recorded in delta table 530) is also referred to herein as the "before" table. The database table 510 at a second point in time, as represented by 520, (e.g., after applying database operations as recorded in delta table 530 which modify 510) is also referred to herein as the "after" table. Using the after table 520 and the delta table 530, a snapshot view or virtual table may be created providing a snapshot of the before table. As will be described below, the snapshot view may be used in connection with client indication processing in accordance with techniques herein.

Referring to FIG. 7, shown is an example 600 of the query that may be used to generate the virtual snapshot table or view for the database table as illustrated in FIG. 6 in an embodiment in accordance with techniques herein. It should be noted that the query represented in the example 600 may be considered a general representation of the database query statements, clauses, operators, and the like, that may be include in a query used to generate the snapshot view of virtual table. The syntax used to actually implement such a query may vary with database, query language, and the like, as may be utilized in an embodiment. Despite any such variations, those skilled in the art will recognize the particular query statements and keywords, operations, conditions and the like, (e.g., SELECT, INNER JOIN, LEFT JOIN) and associated semantics as known in the art in connection with databases.

The query of FIG. 7 includes a first select statement in lines 602 and 604:

Select * from Delta_TABLE LEFT JOIN AFTER_TABLE
on Delta_TABLE . KEY=AFTER_TABLE . KEY The goal of the foregoing first select statement is to obtain in the aggregate all data from the delta table in combination with any corresponding object property information of the after table for all objects identified in the delta table. The objects identified in the delta table drive or determine the entries included in the result of the foregoing select statement. The delta table as described above may include information describing the before table, or more generally, the state of the database table prior to updating with a new set of polling data. Each of the rows in the delta table identifies an object having an associated PK value and other recorded data values (e.g., for the LUN's "NAME" property) which is combined (via the LEFT JOIN clause) with other data values or object properties as retrieved from the after table. The properties retrieved from the after table include any updated values as a result of applying a change operation to update a row of the database table. The LEFT JOIN keyword included in 602-604, having a general format of "A LEFT JOIN B" indicates to take all entries from table A and exclude entries or rows which are only in B. Thus, A drives the rows included in the result which correspond to different objects (as indicated by the KEY value corresponding to the PK 510a), where each such result row includes that as in table A that is "joined" with property values for those objects as included in the table B.

The statement of 602, 604 further customized from the general format for use with the example of FIG. 6 may be represented as Select * from Delta_TABLE LEFT JOIN AFTER_TABLE
on Delta_TABLE . LUN #=AFTER_TABLE . LUN # where KEY is replaced with LUN#, since LUN# is the PK in this example.

In the event that there are multiple properties serving as PKs, the "ON" clause may be further extended. For example, if there are two properties or columns of the table, PTY1 and PTY2, serving as the PKs for the database table, the statement 602, 604 may be replaced with Select * from Delta_TABLE LEFT JOIN AFTER_TABLE
ON Delta_TABLE . PTY1=AFTER_TABLE . PTY1 AND
Delta_TABLE . PTY2=AFTER_TABLE . PTY2

Figure 8:
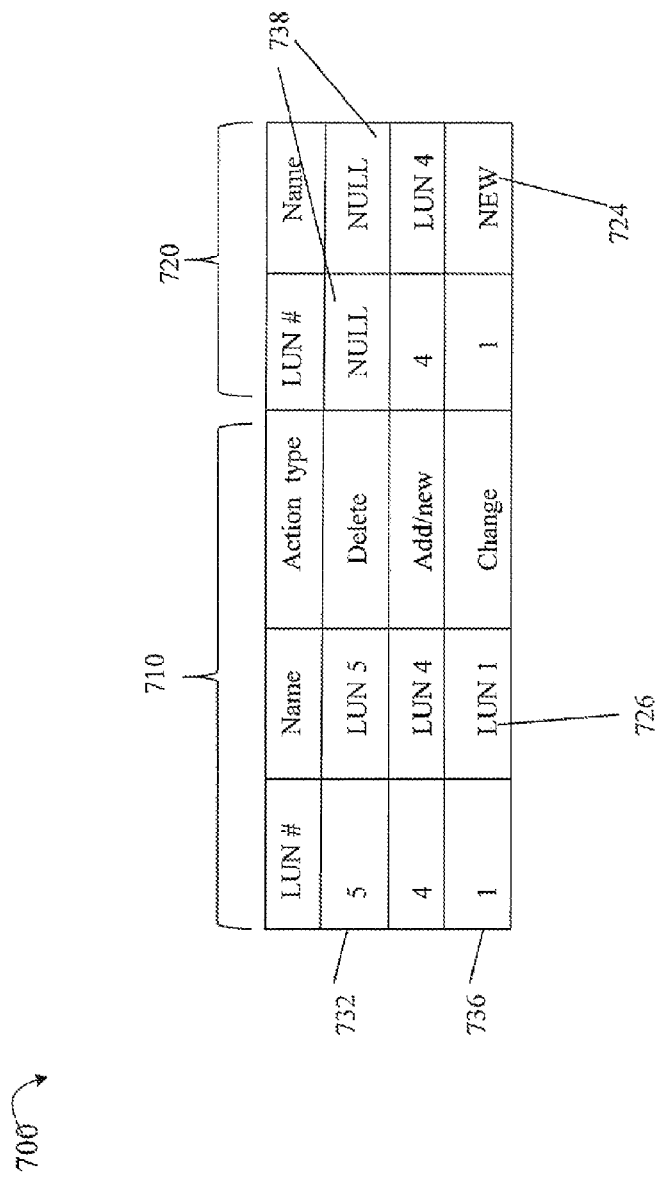

Referring to FIG. 8, shown is an example representing the resulting virtual structure upon executing the first select statement of lines 602, 604 of the query of FIG. 7. Because of the LEFT JOIN, the resulting virtual table of 700 includes 3 rows for the objects represented in the delta table 530. Each row of the resulting virtual table includes additional properties for such objects as retrieved from after table 520. Columns 710 represent information extracted from the delta table and columns 720 represent information extracted from the after table 520. Note that the after table 520 does not include any row for the object having LUN#=5 (e.g., as in row 732) and the virtual table of 700 thus includes no information in 738 as represented by the NULL indicators. For a change operation as represented by row 736, the virtual table of 700 includes a "before" or previous value 726 and an "after" or updated value 724 for the Name property of the object having LUN#=1. The foregoing data values 724, 726 may be used in connection with determining whether the database change operation actually modified the data value of a particular property. Furthermore, both values may be used to determine if, for a registered client data element, there is a net effect or change to the client data element thereby requiring firing and indication. As described elsewhere herein, modification of a database data element upon which a client data element is dependent does not always result in a change to the client data element (e.g., firing a client indication). For example, consider a client data element A=a+b, where a and b are database element properties. If, "before" values are a=5 and b=3, both a and b may be modified to have "after" values as: a=3 and b=5 thereby having no net effect or change on the client data element A. Therefore, no client indication should be fired with respect to client data element A.

It should be noted that in connection with an action type of change, the delta table for an embodiment may include a recorded entry with all properties of the database table along with the PK, or may optionally include the PK along with only the relevant one or more properties affected by the database change operation.

Figure 9:
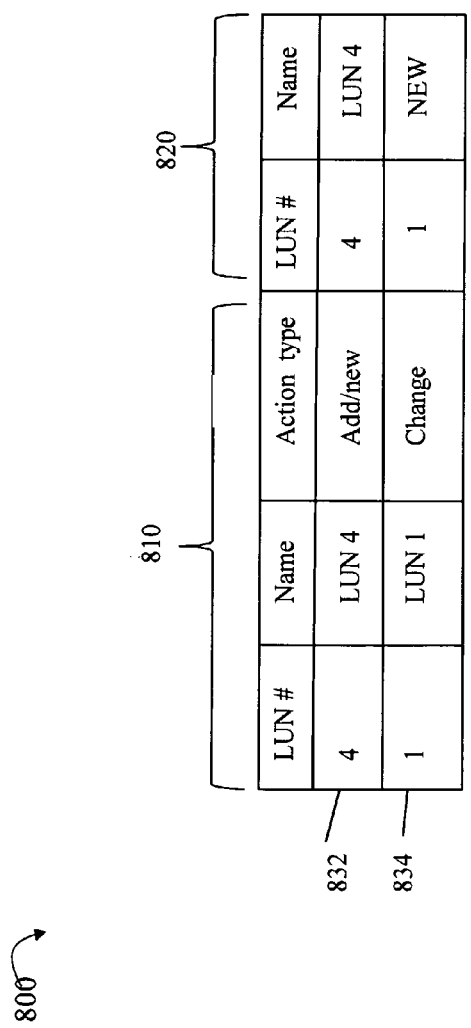

The SELECT statement of lines 608, 610, 612 and 614 select all (e.g., "Select *") entries from After table, which do not exist in the INNER JOIN of After table and delta table. The select statement of 612 614 generates a result that inner joins rows of the two database tables, after table and delta table, where delta table . key and after table . key are the same or equal values. Generally, a JOIN clause as may be used in connection with a database query or command combines records (e.g. rows or entries) from two or more database tables resulting in a set that can be saved as a table or used as is. A JOIN is a means for combining fields from two tables by using values common to each. An INNER JOIN creates a new result table by combining column values of two tables (e.g. T1 and T2) based upon the join-predicate. The query compares each row of T1 with each row of T2 to find all pairs of rows which satisfy the join-predicate (e.g., as indicated by the ON clause). When the join-predicate is satisfied, column values for each matched pair of rows of T1 and T2 are combined into a result row. The result of the join can be defined as the outcome of first taking the Cartesian product (e.g. intersection or cross join) of all records in the tables (combining every record in table T1 with every record in table T2). All records which satisfy the join predicate are returned. The From clause of the Select statement of 612 in combination with the table "after table" reference in 608 identifies the tables to be joined. Line 614 beginning with the keyword "ON" specifies the predicate or criteria which must be satisfied. The INNER JOIN clause effectively represents the intersection of rows of the delta table and after table (e.g., rows or objects common to both tables). The resulting rows each include all values of all properties in combination from the two tables as represented in FIG. 9. the example 800 of FIG. 9 includes a virtual table having a first portion 810 representing information extracted from the delta table and a second portion 820 representing information extracted from the after table. The rows 832, 834 correspond to objects having rows in both of the foregoing tables.

As noted above, the SELECT statement of lines 608, 610, 612 and 614 select all (e.g., "Select *") entries from After table, which do not exist (e.g., Where NOT EXISTS) in the INNER JOIN of After table and delta table. Thus, with reference to this particular example, the Select statement of lines 608, 610, 612 and 614 select all rows or objects (as identified by the PK "KEY" which is LUN# in this case) from After table which are not included in the representation 800 of FIG. 9. That is, the Select statement of lines 608, 610, 612 and 614 selects rows of objects from after table excluding the two rows having LUN#=4 and LUN#=1 (e.g., rows having LUN#=0, 2 and 3). Furthermore, the foregoing SELECT statement of lines 608, 610 612 and 614 indicates to specify a value of "NO CHANGE" as the ACTION TYPE for such rows.

Turning now to the UNION clause as indicated at line 606 of FIG. 7, the UNION clause functions similar to the set UNION operation and combines the results of two queries (as indicated by the two SELECT statements—first select statement at lines 602, 604 and second select statement at lines 608, 610, 612, and 614) into a single virtual table of all matching rows. The result of executing the query of FIG. 7 is represented as the virtual table or view of FIG. 10. Note that element 910 represents the result of the first Select statement of the UNION operator (e.g., select statement at lines 602, 604) and element 920 represents the results of the second select statement of the UNION operator (e.g., result of lines 608, 610, 612 and 614).

In terms of set representations, let "A" represent the objects that are included in the delta table and let "B" represent the objects that are included in the after table. Based on this, the query as illustrated and described above to generate the snapshot view or virtual table may more generally represent the set of objects expressed as:

A UNION (B−(A INTERSECT B))

where "UNION" represents the set UNION operation (e.g., the resulting set of objects where each object occurs in A, B, or both A and B) and "INTERSECT" represents the set INTERSECTION operation (e.g., those objects in A and also included B).

In connection with the techniques herein, those entries of the snapshot view of FIG. 10 having an action type of new, change or delete (e.g., omit those with action type=NO CHANGE) may be processed in connection with client indications. In other words, the snapshot view consolidates or summarizes all information needed in connection with determining whether to issue client indications for those client objects dependent on data elements of the database table 510. The snapshot table of FIG. 10 summarizes the database table rows and associated action types that are processed in determining corresponding changes to user object model dependencies and simplifies client indication processing in contrast to other techniques. All changes to the database table 510 are reflected in the representation 900 and the information in 900 as a single consolidated structure contains all data values extracted from appropriate database tables to perform client indication processing.

At this point, client indication processing may be performed using as an input the virtual table or view of FIG. 10 to calculate registered client data elements dependent on the rows having an action type of delete, add/new or change, and then determining whether to generate any indications in accordance with the client subscription information (e.g., whether to fire indications for newly created objects, delete objects and/or changed/updated existing objects (modified property values of existing object). The snapshot view may be used in connection with determining the contents of a database table prior to such modifications (e.g., before table) in order to assess net result or impact to registered client data elements (e.g., registered via prior indication subscription) and also obtaining old or previous data values (e.g., of the before table) as may be needed in connection with supplying such information with client indications. As described herein, the foregoing operations of new, delete and change may be performed with respect to objects included in a registered client structure or entity, such as a client table, or other client object model entity as may be supported in an embodiment. For example, an embodiment may also provide for class indications so that an indication is fired, for example, for a newly created object, deleted object, or changed existing object of a particular class of objects. Depending on the particular data models, the foregoing of new, delete and change may be made with respect to a first entity that may be included in other defined groupings, partitions or categories of client entities.

As described herein, for a client object for which a client is registered to receive different types of client indications of new, delete and change, new may mean to fire a client indication if a new object of this type is created or if a new object is created with respect to a particular client entity such as a client table, and the like, is created. In a similar manner, a client may also be registered to receive indications when such a registered client object is deleted or changed. In connection with calculating the net result or impact on a client object with respect to an operation of add, delete or change to a database object, the following database data is needed:

| client registered indication | previous data required? | new data required? |
|---|---|---|
| New | Not applicable | Yes |
| Delete | Yes | Not applicable |
| Change | Yes | Yes |

Thus use of the snapshot view provides all such data needed in connection with client indication processing.

In an embodiment, information from the foregoing virtual table or view of FIG. 10 resulting from the query may be provided to a module, such as DAL or another module, in a single communication for client indication processing. The foregoing information, such as those rows of the snapshot view with change type=add, delete or change, may be provided in a single communication to the module performing indication processing. For example, information of snapshot view rows with change type=add, delete or change may be provided in a single structure as an input parameter in connection with a single call to the module performing indication processing. The foregoing provides an advantage of reduced inter-module communication over other implementations, for example, such as those which may otherwise process fired database trigger individually and sequentially as received so that client indications are generated sequentially for each such fired database trigger. Thus, the information for client indication processing, such as for one or more database tables, as related to database table changes for an entire set of polling data may be aggregated or combined into a single transaction. Another use of the techniques herein may be in connection with reducing or avoiding an indication "storm". An indication storm may be characterized as occurring in a system where the number of indications saturates or overwhelms the system by consuming an excessive undesirable amount of the system's resources thereby adversely affecting other processing performed by the system. Having an aggregated set of information (e.g., generated as a result of database triggers as used in connection with client indication processing) as described allows a system to assess processing as related to an entire set of aggregated database changes to avoid indication storms. The indication processing may, for example, examine the number of database modification operations (e.g., add/new, delete and change) and estimate that the amount of resources required to process such operations with respect to client indication processing exceeds a threshold amount. As such, steps may be taken proactively, to avoid indication storms such as pacing the amount of resources consumed, sending a single client indication rather than multiple client indications, and the like.

Another use of the snapshot view or virtual table and the delta table is in connection with audits. A query generating the snapshot view may be stored along with the delta table and after table where the snapshot view may be executed at a later point in time using the delta and after tables to re-generate the corresponding before table. The foregoing may be used as one technique for verifying and auditing the data integrity of database tables.

It should be noted that the indication management and processing such as described in connection with FIG. 3 illustrates a single IM. More generally, indication management and processing using techniques herein may also be performed in an embodiment including a hierarchy of indications managers, for example, as described in U.S. patent application Ser. No. 12/928,653, filed Dec. 15, 2010, TECHNIQUES FOR PERFORMING INDICATION MANAGEMENT, which is incorporated by reference herein.

The foregoing techniques provide benefits such as a reduction in overhead incurred (e.g. such as in connection with communications between modules, caching, and the like) when performing indication processing as opposed to other implementations which, for example, may cache entire old and new data objects and then determine differences therebetween in connection with generating client indications.

Figure 11:
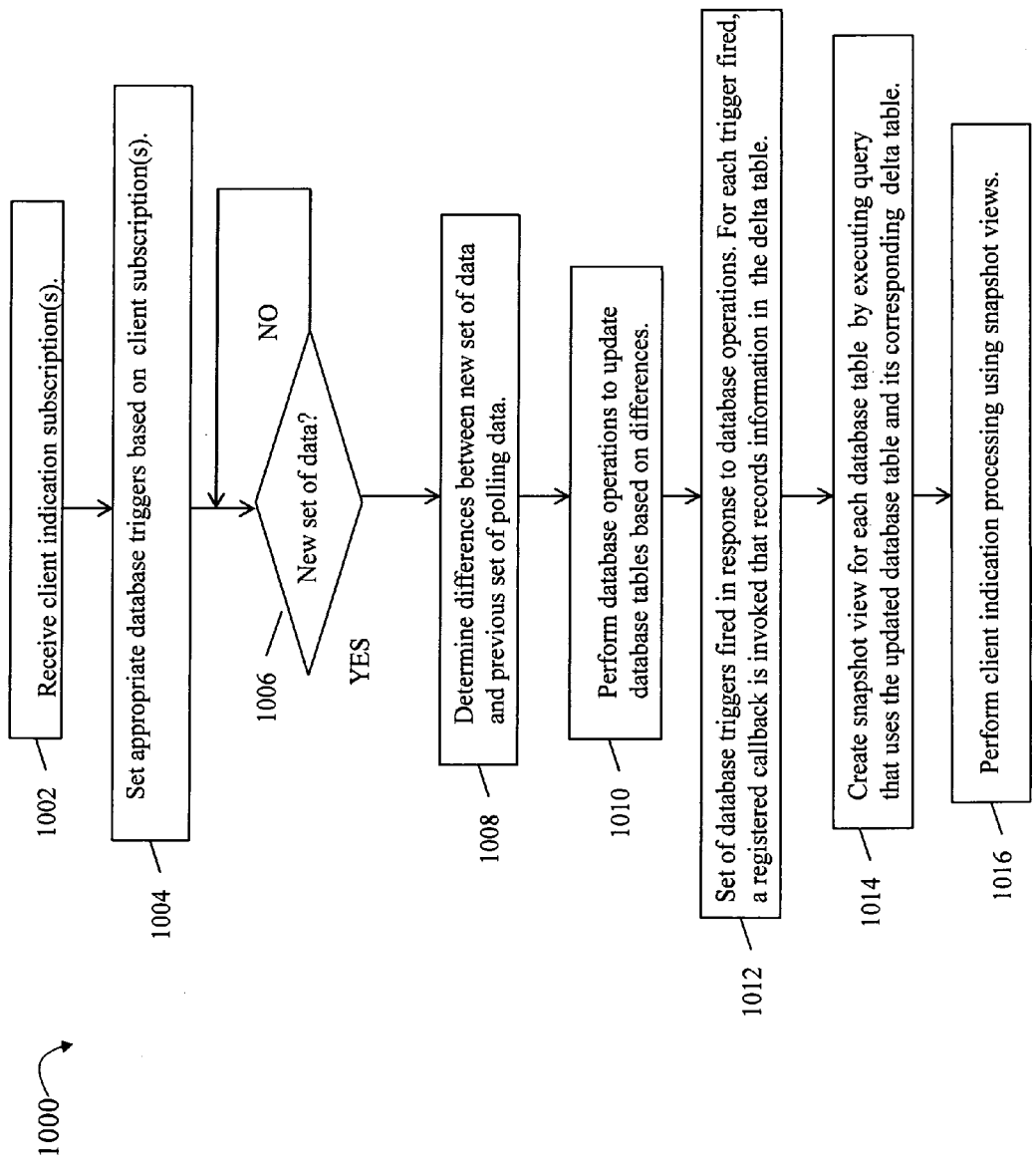
FIG. 11 is a flowchart of processing steps that may be performed in an embodiment in accordance with techniques herein.

Referring to FIG. 11, shown is a flowchart of processing steps that may be performed in an embodiment in accordance with techniques herein. The flowchart 1000 summarizes processing described above. At step 1002, client indication subscription requests are received and processed. At step 1004, appropriate database triggers are set for database tables of the database model in accordance with the client subscription(s). At step 1006, a determination is made as to whether a new set of polling data has been received. If not, processing waits at step 1006 until the next new set of polling data is received. At step 1008, differences between the new set of polling data and the previous set of polling data are determined. At step 1010, database operations are performed to update the database tables based on the differences. At step 1012, a set of database triggers fire in response to performing the database operations in step 1010. For each trigger fired, a previously registered callback routine is invoked that records information in the delta table for each of the database tables. At step 1014, a snapshot view for each database table is created by executing a query that uses the database table's corresponding delta table and the currently updated database table contents (e.g. after table). At step 1016, client indication processing may be performed using the generated snapshot views for the database tables. As described above, step 1016 includes processing each entry of the snapshot views having an action type of new, delete or change; calculating the impact of each such entry (e.g., database data element) and associated action on the registered client data elements; and firing client indications based on the calculated impact and registration criteria (e.g., type of indications which the client is registered to received, where type may be new, delete or change with respect to a client data element.

It should be noted that the query statement, and portions thereof, may be represented using logical equivalents than as described herein. Furthermore, the query template as described and illustrated such as in connection with FIG. 7 may be generalized and applied for use in connection with any database table.

An embodiment may implement the techniques herein using code executed by a processor. For example, an embodiment may implement the techniques herein using code which is executed by a processor of the data storage system, a computer system, and the like. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing indication management comprising:

receiving registration criteria including information identifying a first set of one or more data elements of a first data model about which a subscriber is registered to receive notifications;

performing one or more operations to a second set of one or more data elements stored in a first table of a database in accordance with a second data model, each of said one or more operations being an operation to modify one of the data elements stored in the first table, add a row to said first table or delete a row from said first table;

recording in a delta table information regarding said one or more operations;

executing a query that uses said delta table and said first table after being updated by said one or more operations to generate a virtual table including information regarding said one or more operations performed to said first table, wherein each row of said virtual table includes a column with an action type, said action type being one of a plurality of types including a first type indicating no change for a data element associated with said each row, wherein said query includes a first select statement that selects entries from the first table which do not exist in an inner join of the delta table and the first table and includes a row in said virtual table for each entry selected by the first select statement indicating said each entry as being said first type indicating no change and wherein said query includes a second select statement that results in one or more others of said plurality of types being included in one or more rows of the virtual table, wherein said first select statement includes a third select statement comprising an inner join clause that is executed to determine said inner join of the delta table and the first table, and wherein said second select statement includes a left join clause that is executed to determine a left join of the delta table and the first table;

performing first processing to determine notifications for the subscriber regarding data elements of the first set in accordance with said registration criteria, said first processing using information including said virtual table, wherein no notification is sent to the subscriber as a result of said first processing for any row of the virtual table having an action type of the first type indicating no change; and sending a notification to the subscriber as a result of said first processing for at least one row of the virtual table having an action type other than said first type.

2. The method of claim 1, further comprising:
selectively setting one or more database triggers on said first table based on said registration criteria.

3. The method of claim 1, wherein a database trigger is fired in response to performing each of said one or more operations to said first table of the database.

4. The method of claim 3, wherein a registered callback is invoked in response to said database trigger and said registered callback records information in the delta table for said each operation.

5. The method of claim 1, wherein said first processing includes:
determining dependencies of said first set of data elements upon said one or more data elements of said first table using said virtual table; and
determining whether modifications made to said first table as indicated by said virtual table result in a change to a registered data element of said first set of data elements about which a client is registered to receive notification regarding one or more operations performed with respect to the registered data element.

6. The method of claim 5, wherein said dependencies are determined using mapping information identifying which registered data elements of the first data model are dependent on data elements of the second data model.

7. The method of claim 1, wherein said virtual table includes a row describing each object in said first table and each object in said delta table, each row in said virtual table having a unique value of a primary key identifying a different object of the second data model, said primary key being a primary key of said first table and said delta table.

8. The method of claim 1, wherein said virtual table includes a row for each of said one or more operations, said row including information identifying the action type that is any of said modify, said add, said delete, or no change.

9. The method of claim 8, wherein said first processing includes determining net changes to registered data elements of the first data model using rows of said virtual table including an action type that is any of modify, add or delete, and omitting rows of the virtual table having an associated action type of no change.

10. The method of claim 8, wherein said delta table indicates an action type for each entry of said delta table that is any of modify, delete or add.

11. The method of claim 1, wherein said one or more operations are actions performed to the database based on differences determined between data obtained for two successive polling intervals.

12. The method of claim 1, wherein said first data model is an object model including a plurality of objects and, for each of said plurality of objects, one or more attributes, and wherein said first set of one or more data elements identifies at least one of the plurality of objects or at least one attribute of one of said plurality of objects.

13. The method of claim 12, wherein said first set identifies a first object and said registration criteria indicates to provide notification regarding a change to one or more attributes of the first object.

14. The method of claim 12, wherein the registration criteria includes providing notification regarding any of deletion of an object of said plurality of objects, creation of an object of said plurality of objects, modification to an attribute of an object of said plurality of objects, and modification to any object of a class of said plurality of objects.

15. The method of claim 1, wherein a first data element in the first data model identified in the registration criteria is determined to be dependent upon a plurality of data elements from the second data model.

16. The method of claim 15, wherein the first data element is an object having a plurality of attributes, a first of the plurality of attributes being determined using one or more data elements from the second model.

17. The method of claim 1, wherein said query includes said select statements and a union operation of results of each of said select statements.

18. A non-transitory computer readable medium comprising code stored thereon that, when executed, performs a method for indication management, the method comprising:
receiving registration criteria including information identifying a first set of one or more data elements of a first data model about which a subscriber is registered to receive notifications;
performing one or more operations to a second set of one or more data elements stored in a first table of a database in accordance with a second data model, each of said one or more operations being an operation to modify one of the data elements stored in the first table, add a row to said first table or delete a row from said first table;

recording in a delta table information regarding said one or more operations;

executing a query that uses said delta table and said first table after being updated by said one or more operations to generate a virtual table including information regarding said one or more operations performed to said first table, wherein each row of said virtual table includes a column with an action type, said action type being one of a plurality of types including a first type indicating no change for a data element associated with said each row, wherein said query includes a first select statement that selects entries from the first table which do not exist in an inner join of the delta table and the first table and includes a row in said virtual table for each entry selected by the first select statement indicating said each entry as being said first type indicating no change and wherein said query includes a second select statement that results in one or more others of said plurality of types being included in one or more rows of the virtual table, wherein said first select statement includes a third select statement comprising an inner join clause that is executed to determine said inner join of the delta table and the first table, and wherein said second select statement includes a left join clause that is executed to determine a left join of the delta table and the first table;

performing first processing to determine notifications for the subscriber regarding data elements of the first set in accordance with said registration criteria, said first processing using information including said virtual table, wherein no notification is sent to the subscriber as a result of said first processing for any row of the virtual table having an action type of the first type indicating no change; and sending a notification to the subscriber as a result of said first processing for at least one row of the virtual table having an action type other than said first type.

19. The non-transitory computer readable medium of claim 18, further comprising code for:

selectively setting one or more database triggers on said first table based on said registration criteria.

20. The non-transitory computer readable medium of claim 18, wherein a database trigger is fired in response to performing each of said one or more operations to said first table of the database and a registered callback is invoked in response to said database trigger and said registered callback records information in the delta table for said each operation.

* * * * *